United States Patent [19]
Ryan

[11] Patent Number: 5,751,806
[45] Date of Patent: *May 12, 1998

[54] AUDIO INFORMATION DISSEMINATION USING VARIOUS TRANSMISSION MODES

[75] Inventor: John O. Ryan, Cupertino, Calif.

[73] Assignee: Command Audio Corporation, Redwood City, Calif.

[*] Notice: The term of this patent shall not extend beyond the expiration date of Pat. No. 5,406,626.

[21] Appl. No.: 769,092

[22] Filed: Dec. 18, 1996

Related U.S. Application Data

[60] Division of Ser. No. 181,394, Jan. 12, 1994, Pat. No. 5,590,195, which is a continuation-in-part of Ser. No. 31,763, Mar. 15, 1993, Pat. No. 5,406,626.

[51] Int. Cl.⁶ .................. H04L 9/00; H04B 1/06
[52] U.S. Cl. .................. 380/9; 380/49; 380/50; 455/45
[58] Field of Search .................. 380/4, 9, 23, 25, 380/49, 50, 59; 340/825.31, 825.34; 455/39, 42, 45

[56] References Cited

U.S. PATENT DOCUMENTS

| | | | |
|---|---|---|---|
| 4,247,908 | 1/1981 | Lockhart et al. | 395/325 |
| 4,266,243 | 5/1981 | Shutterly | 380/19 |
| 4,323,921 | 4/1982 | Guillou | 380/23 X |
| 4,393,277 | 7/1983 | Besen et al. | 379/88 |
| 4,473,824 | 9/1984 | Claytor | 340/825.27 |
| 4,608,456 | 8/1986 | Paik et al. | 380/28 |
| 4,677,552 | 6/1987 | Sibley, Jr. | |
| 4,682,368 | 7/1987 | Takahashi | |
| 4,683,586 | 7/1987 | Sakamoto et al. | 380/48 |
| 4,752,953 | 6/1988 | Paik et al. | 380/9 |
| 4,788,543 | 11/1988 | Rubin | 340/825.44 |
| 4,852,086 | 7/1989 | Eastmond et al. | 370/69.1 |
| 4,868,866 | 9/1989 | Williams, Jr. | 380/49 |
| 4,942,616 | 7/1990 | Linstroth et al. | 381/51 |
| 5,042,070 | 8/1991 | Linna et al. | 381/59 |
| 5,086,510 | 2/1992 | Guenther et al. | |
| 5,131,020 | 7/1992 | Liebesny et al. | 379/59 |
| 5,133,010 | 7/1992 | Borth et al. | 381/38 |

(List continued on next page.)

FOREIGN PATENT DOCUMENTS

| | | | |
|---|---|---|---|
| 373386 | 6/1990 | European Pat. Off. | G08G 1/0967 |
| 2651352 | 3/1991 | France | G08G 1/096 |
| 4024132 | 2/1992 | Germany | H04L 9/18 |
| WO/8704309 | 7/1987 | WIPO | H04B 7/00 |
| WO/8901429 | 2/1989 | WIPO | B60R 11/02 |

*Primary Examiner*—Bernarr E. Gregory
*Attorney, Agent, or Firm*—Skjerven, Morrill, MacPherson, Franklin & Friel; Norman R. Klivans

[57] ABSTRACT

A system and method of information dissemination that permits the user to listen to the specific content of information when and where he or she wants to. A radio or television receiver system receives information from a FM subcarrier, a television vertical blanking interval transmission, a television separate audio program transmission or a dedicated channel and stores the transmitted information in a memory. A user interface allows selection from the memory of the stored information via a set of menus controlling a hierarchical database, so as to access particular items of information. Typically the system includes RAM and/or a storage medium such as a digital audio tape, a magneto-optical mini-disk, a magnetic disk or optical disk, sufficient to store information for 10 hours of audio. A decompression device, accepts the accessed compressed digital audio information items which may have been encrypted and transforms them into spoken speech. The user interface is either by voice or a single or multi-position switch allowing scanning through and selection from the menu items. The signal for such a device is generated by converting analog audio signals into a digital audio data stream which may be encrypted. The encrypted digital data stream is compressed and inserted on the radio or television carrier via an FM Subcarrier, the television vertical interval or the separate audio program channel of a television transmitter. The system is also capable of transmitting alphanumeric data and converting this alphanumeric to a voice form using a speech synthesizer.

28 Claims, 2 Drawing Sheets

U.S. PATENT DOCUMENTS

| | | | |
|---|---|---|---|
| 5,146,473 | 9/1992 | Critchlow et al. | 375/8 |
| 5,146,612 | 9/1992 | Grosjean et al. | |
| 5,152,011 | 9/1992 | Schwob. | |
| 5,177,685 | 1/1993 | Davis et al. | |
| 5,182,555 | 1/1993 | Sumner. | |
| 5,206,641 | 4/1993 | Grant et al. | |
| 5,210,611 | 5/1993 | Yee et al. | 348/473 |
| 5,239,700 | 8/1993 | Guenther et al. | 455/158.4 |
| 5,295,154 | 3/1994 | Meier et al. | 375/200 |
| 5,406,626 | 4/1995 | Ryan | 380/9 |
| 5,590,195 | 12/1996 | Ryan | 380/9 |

AUDIO INFORMATION DISSEMINATION USING VARIOUS TRANSMISSION MODES

This application is a division of application Ser. No. 08/181,394 filed Jan. 12, 1994 and is now U.S. Pat. No. 5,590,195, which is a Continuation-in-Part of application Ser. No. 08/031,763, filed Mar. 15, 1993 entitled RADIO RECEIVER FOR INFORMATION DISSEMINATION USING SUBCARRIER by John O. Ryan, now U.S. Pat. No. 5,406,626, issued Apr. 11, 1995.

BACKGROUND

This invention relates to a radio or television broadcasting system for transmission of audio information to a specially adapted receiver which converts the selected transmitted audio information to a form usable by the user.

Numerous systems transmit information on FM radio subcarriers. See for instance, U.S. Pat. No. 5,152,011 issued to Schwob, Sep. 29, 1992. Also known is a single sideband communication system with FM data capability for transmission of analog voice signals. See U.S. Pat. No. 4,852,086 issued to Eastmond et al., Jul. 20, 1989.

Also known is FM radio sideband broadcasting to specially adapted computers for transmission for instance of news and financial information. Commercially available products available from Mainstream, Telemet, and DeskTop Data broadcast data over FM radio sidebands for receipt by personal computers equipped with special FM radio receivers and software. Typically information is transmitted in digital form, received, and stored in the computer memory for access by the computer user using menu driven software. The data is displayed on the computer screen in conventional alphanumeric form. One product in this category is News Edge, a news service available from DeskTop Data, Inc. of Waltham, Mass. which delivers a number of news and financial information services to a user via FM radio sideband. Software provided with the product scans incoming information and when the incoming information meets parameters set by the user, the information is saved to disk and/or displayed on the computer screen.

These systems have the disadvantage of requiring a personal computer as a platform, and providing information only on a computer screen. The usual computer skills are needed in order to operate such systems, which tend to be quite expensive.

Data can also be transmitted in the Vertical Blanking Interval of a TV transmission. The Federal Communications Commission has set aside several lines of the Vertical Blanking Interval for point to multipoint data transmission which may be sold to interested users.

An additional channel of communication for data or audio transmission is the Separate Audio Program channel available in television broadcasting.

All of these systems have disadvantage that the listener or user of the data must be tied down to a specific place or time to hear the information. The portable radio, be it hand held or in an automobile also limits the user to getting only the information that is presently being transmitted.

SUMMARY

The system and method described below permits the user to listen to the specific content of information when and where he or she wants to. The present invention is directed to a method and system for information dissemination using various modes of transmission that satisfies the needs of such a user. The invention includes a system for receiving information via a tuner that extracts digitized alphanumeric data or compressed audio data from the Vertical Blanking Interval of a television station's video signal, the Separate Audio Program (SAP) signal from a television stations audio signal or a system for receiving the digitized alphanumeric data or compressed audio information via radio sidebands (subcarriers) which includes an FM subcarrier of an FM broadcast signal. In addition, a suitable dedicated transmission facility could be used. Conditional access circuitry decrypts the previously encrypted digitized alphanumeric data or compressed audio data which is then stored in a random access memory. A user interface (either a simple manual or voice control) driving a hierarchy of menus allows a user to access the information by indicating his selections from the menus. The system then extracts the information from the database in decrypted form. A voice activation device including a decompression system and a digital to analog convertor (D/A) or other speech producing device converts the encrypted digitized audio information to an audio signal for provision to the user via a loud speaker or earphones.

This system may be stand alone or be a part of an existing radio receiver, sharing components of the radio receiver. One embodiment of the user control is a four way switch (the positions corresponding for instance to the cursor control keys on a computer) for selection from and scanning through menus listing various categories of information. Typically the system includes either volatile RAM memory or a non-volatile storage medium such as a digital audio tape, a magneto-optical mini-disk, a magnetic disk or optical disk, sufficient to store information for 10 or more hours of audio. The information is for example news, sports, weather, cultural information, advertisements, or commercial listings. The information is transmitted in encrypted digital form using data compression techniques which is readily stored. The use of encryption techniques controls access to the information data base as a whole or to selected parts that the user has contracted for.

Other features are user control over the speed at which the speech is outputted, and a channel skipping tuner for finding the particular FM radio station subcarrier, TV station vertical interval or TV station SAP channel on which the service is provided. The speech producing device may be under either automatic or user control to produce different speeds of the voices. This control of the speed of the voice could be one that changes the pitch or be one that changes the spacing between words. Also, the user has the opportunity to preselect database items, thereby to construct a personal profile so as to extract particular information without having to scan through all the menus.

BRIEF DESCRIPTION OF THE DRAWING

These and other features and other aspects of the present invention will become better understood with reference to the following description, appended claims and accompanying drawings where:

DETAILED DESCRIPTION

Figure 1:
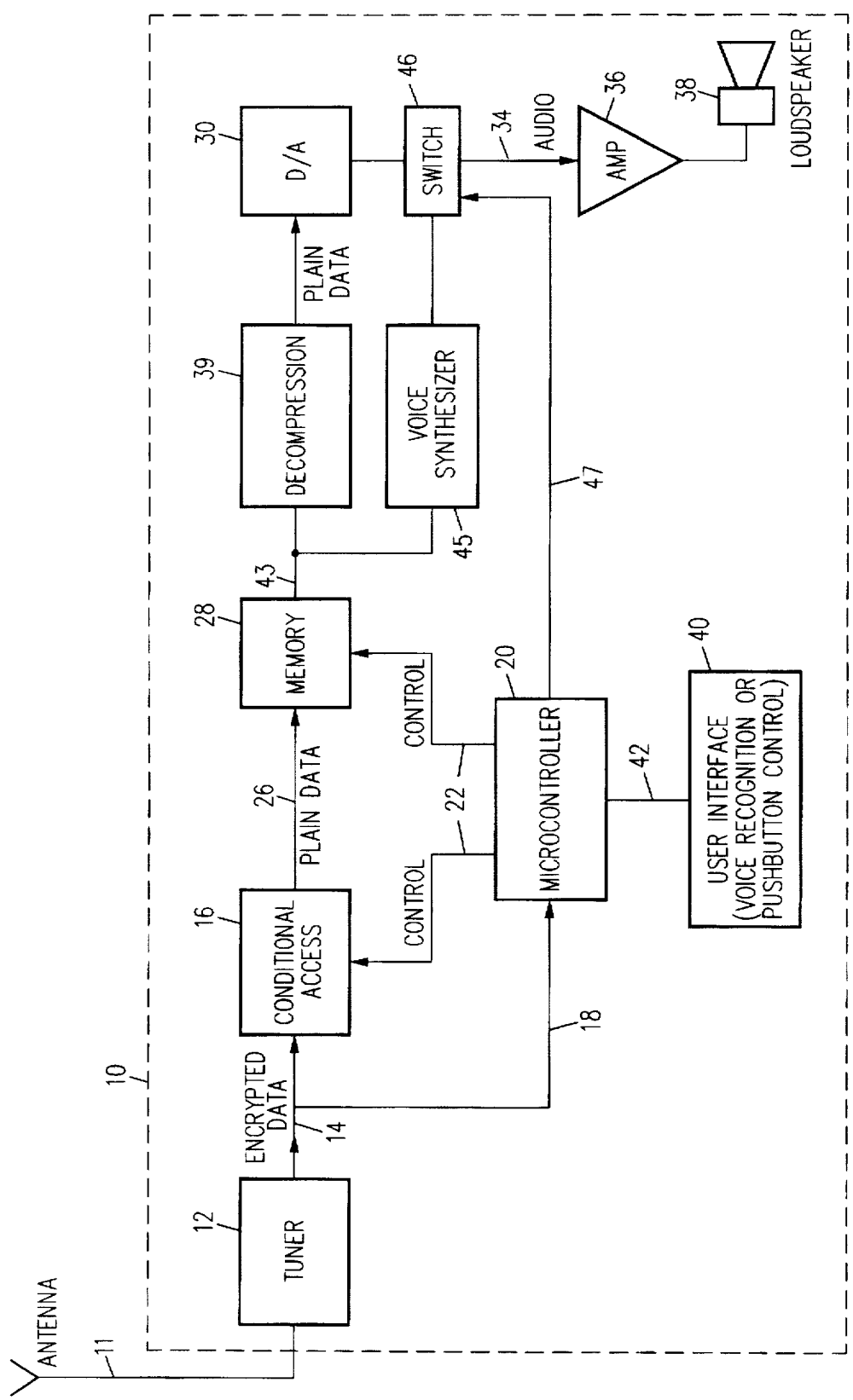
FIG. 1 shows a block diagram of a receiving apparatus in accordance with the present invention.

FIG. 1 shows a device in accordance with one embodiment of the invention. A broadcast signal is received from an antenna by 10 (as used in automobile or portable applications) which provides a received radio broadcast signal or television video broadcast signal to a tuner 12. This tuner is either a FM Subcarrier tuner of the type well known in the art for extracting an FM broadcast subcarrier signal; a television tuner designed to produce the output of the Vertical Blanking Interval; a Separate Audio Program channel from a television broadcast signal; or a dedicated radio channel. In the case of an FM subcarrier tuner, as is well known, the subcarrier signals are typically transmissions of digitized data on subcarriers leased from commercial FM stations. The Vertical Blanking Interval is already available for point to multipoint transmission. The FM Subcarrier or the TV tuner 12 provides on line 14 the extracted digitized audio (which is typically encrypted) to conditional access circuitry 16.

A receiver sub-system converts digitized and encrypted alphanumeric data and compressed digitized audio data 14 from the transmitter to an analog signal representing spoken words. The tuner provides the data to the conditional access system 16 and microcontroller (controller) 20 described below.

Conditional access circuitry 16 ensures that the data is decrypted only if the proper key or command has been provided, as described below. Conditional access circuitry 16 decrypts the received audio data (as authorized by microcontroller 20 over lines 22) on line 26 for storage to the memory 28 which may be conventional integrated circuit random access memory (RAM). In one embodiment the memory comprises volatile RAM memory. In another embodiment this memory may consist of a non-volatile storage medium such as a digital audio tape, a magneto-optical mini-disk, a magnetic disk or an optical disk with sufficient capacity to store information for 10 hours of audio.

Figure 2:
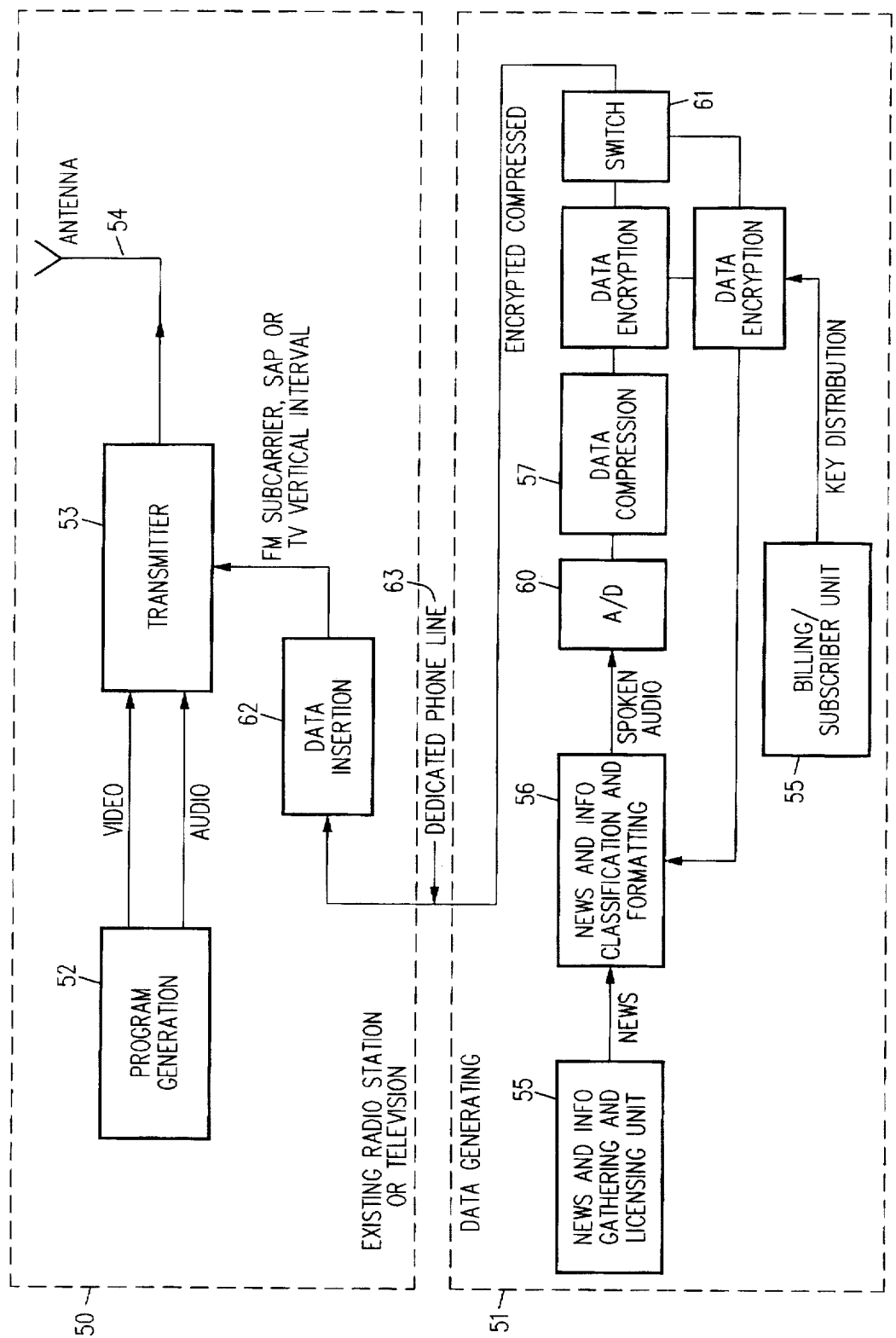
FIG. 2 shows a block diagram of a transmission system in accordance with the present invention.

In order to provide the needed quantity of audio data in a reasonable time frame and to minimize the memory requirement the original audio data is ideally passed through a data compression algorithm at the transmitting end to compress the data sufficiently for a narrow band data transmission channel. This is shown in FIG. 2, at 58 and will be discussed later. The receiving apparatus has a companion decompression algorithm, 39, at the output of the memory to provide the decompressed audio data to the digital to analog convertor for conversion of the digitized audio data to analog audio signals.

The conditional access system 16 and microcontroller 20 are described below. The encrypted compressed data output of the tuner is accessed under control of microcontroller (microprocessor) 20 via control signals at lines 22, to determine which particular items of data stored in memory 28 are to be provided via output line 43 to the decompression circuitry 39 via switch 45.

Much of the data that a user would use in such a system is in alphanumeric form that can be easily transmitted in that form and converted to audio via speech synthesis. Such data can be transmitted in alphanumeric form for bandwidth and speed considerations. In order to accommodate the dual transmission of alphanumeric data as well as audio data, switch 46 controlled by microcontroller 20 determines whether the system is responding to original alphanumeric data or compressed audio data. When alphanumeric data is being transmitted, the alphanumeric data is fed into a speech synthesizer 45 whose audio output is connected to switch 46 for connection of the audio output to audio amplifier 36 and loudspeaker 38.

In other embodiments, the received data is stored as encrypted data or in another convenient form and converted to a form usable by a speech producing device prior to being converted to speech. Each audio data item is "tagged" with an designation to allow retrieval of the stored encrypted audio data from the database.

User interface 40 inputs commands on line 42 to microcontroller 20 to determine which items of data from random access memory 28 are to be listened to.

The transmitted information is categorized, stored, and accessed in a conventional hierarchial database in memory 28 under control of microcontroller 20. A user interface (either a simple manual or voice control) driving a hierarchy of menus allows a user to access the information by indicating his selections from the menus.

In one embodiment user interface 40 is a voice activated command system. For instance the device is turned on and initialized by the user's spoken "ON" command. It then responds by vocally announcing via loud speaker 38 the major database categories available e.g. "NEWS", "SPORTS", "ENTERTAINMENT", etc. When the desired category has been announced the user responds by saying "YES". The device then announces again the sub-categories of the selected major category, and the user again selects the desired sub-category with a spoken "YES" until the specific item needed is accessed. For example, the category and sub-category path to the latest news regarding the General Motors Corporation might be "NEWS . . . BUSINESS . . . NATIONAL . . . AUTOMOTIVE . . . GM." The path to a review of the recent movie Aladdin might be "ENTERTAINMENT . . . HOLLYWOOD . . . MOVIE REVIEWS . . . ALADDIN."Typically items will be reached after four or five "YES" responses from the user. In one embodiment three additional spoken commands by the user such as "BACK" "STOP" and "GO" are sufficient to provide the user effective and rapid control of the system.

In another embodiment a manual input device such as a switch assembly having for instance four positions (up, down, left, right) corresponding to the familiar cursor control on a computer, with each position indicating one of four commands, is provided for user manual operation. This switch may be adapted to attach to the steering wheel of an automobile, for use by the driver. The control is linked to the rest of the device by wire, infrared, or ultrasonically, as is a conventional television remote control.

Another version uses a one-position control switch. The user briefly depresses the switch to select the category or item as announced or to scan through the menus. Briefly depressing the switch while an actual data item is being read executes "stop." Depressing it again then executes "go." Holding the switch down for a second or two executes "back" at any time, to return to a predetermined point in the database.

For full effectiveness the information dissemination device needs to be on 24 hours a day. In order to conserve power the received data could be first stored in random access memory (RAM) which consumes little power and when the RAM is full dumped to a more permanent storage medium such as a digital audio tape, a magneto-optical mini-disk, a magnetic disk or an optical disk, sufficient to store information for 10 hours or more of audio. The speech producing device 30 may be a digital to analog convertor that converts digitized and decompressed audio data into understandable and well modulated audio analog signals. The audio analog signals are provided on line 34 to a conventional audio amplifier 36 and hence to a loud speaker or earphones 38 to be listened to by the user. Tuner 12, microcontroller 20, conditional access circuitry 16 and memory 28 typically remain powered at all times (by battery power if necessary) to receive a continuous update of the broadcast database, and thereby to store current news in memory 28.

When using the Vertical Blanking Interval, it is possible to transmit at a rate of 2 megabits per second on 6 Vertical Blanking Interval lines each with a 50 microseconds duration to provide a 24,000 bit per second channel with a 50% error correction overhead. In one version the device of FIG. 1 is a portable unit (similar to a portable radio) and includes the user voice or manual interface. In another embodiment the device of FIG. 1 is built into a conventional portable radio or automobile radio, sharing where possible common components.

In one embodiment user interface 40 has a speed control to determine the output speed of speech output. The Digital to analog convertor 30 or the Speech synthesizer 44 may receive information faster than normal speaking speed. It is well known that people can understand speech at faster than normal speech rates. Thus the user by pushing a button on the receiver unit or providing the proper verbal command increases the speech speed, so as to obtain information faster, analogous to skimming printed material. This speeding up can use well known techniques that change the pitch or eliminates the gaps between words. A similar slowing down approach can be used in case the user wants to carefully note what is being said for example while taking notes.

In the embodiment using a voice activated user interface 40, the number of commands provided is limited (for instance to 5 to 10) and hence a relatively simple commercially available voice input recognition circuit is sufficient.

In another embodiment, the user interface for an automobile-based system is associated with a heads-up display, expected to be available in various automobiles in the near future. This provides visual display of the database menu items analogous to a computer screen, to allow faster access to the database menus.

Advantageously, by transmitting and storing the audio data in a compressed form (even though encrypted), the required bandwidth of the transmission channel is vastly reduced, as are the memory requirements, thereby substantially reducing the component cost. When used in FM subcarrier transmission, the typical transmission speed is one kilobaud. This is sufficient to download in approximately one hour the needed data to memory 28.

In use, after purchase of the unit the user programs it to the frequencies of the local stations providing the transmissions. There may be multiple such stations in one area, due to the limited transmission distance of FM radio and TV signals. A channel skipping feature (as is now available commercially in various radios) in one embodiment included in microcontroller 20 seeks out stations having a particular signature or frequency, to maintain reception even when moving from the transmission area of one station carrying the service to the transmission area of a second station carrying the service. It would take less than a minute for the system to scan the entire FM band or TV band looking for the signature transmission.

The data encryption/access is accomplished in several ways. In one embodiment a simple addressed on/off command is transmitted (without data encryption) to disable individual units belonging to people who have not paid the required monthly subscription fee to receive the service. The encryption can be used to provide access to the entire data base or to individual parts of the data base.

In a more sophisticated encryption system where it is believed there is a problem of manufacture and sale of unauthorized units, then proper data encryption is used, requiring receipt of a key and decryption of the data with decryption circuitry. Hence unauthorized units without such dedicated decryption circuitry would not be operative at all.

In one embodiment of an encryption system, (analogous to pay-per-view cable TV encryption), decryption keys are delivered by radio transmission. Each individual receiver unit has a unique "hidden" key of for instance 40 to 50 binary digits in read only memory. Each unit also has a "public" non hidden serial number. All transmitted data is conventionally encrypted using a master key which is changed periodically, both to force users to pay for the service and to enhance security. Each receiver unit must receive a master key to decrypt the data transmission.

The master key is transmitted to each unit as follows:

Periodically, the transmission of the data is interrupted to transmit key information. The key information is a series of packets, one packet for each individual receiver unit, with each packet including (1) an address field which is the public serial number of a particular unit; followed by (2) a second field which is the current master key encrypted with the unique "hidden key" of the unit having that particular serial number.

The receivers look for these packets (which are denoted by a particular signature or occur at particular times to avoid confusion with the data). When a particular unit receives the packet including its own address (public serial number), it stores and decrypts the subsequent encrypted master key field, thereby obtaining the master key, in order to decrypt subsequent encrypted data.

In a second encryption system embodiment, a uniquely encrypted master key for each individual receiver is physically delivered to each user periodically (such as once a month).

The key could be entered into each unit by a keypad, or the key could be embodied in an electronically readable card or device inserted into a suitable port in the receiver.

In another embodiment, speech output device 30 is controlled to provide a variety of particular voices. These voices are selected by the user, i.e. to be male/female or other voices, or the system is programmed via microcontroller 20 to select different voices for different types of or categories of information.

The device of FIG. 1 as incorporated in a conventional radio or television receiver uses the antenna of the radio or television receiver. The tuner 12 may be in addition to the conventional radio or television tuner or could be part of the radio or television tuner. The other blocks of FIG. 1 (with the exception of amplifier 36 and loud speaker 38) are unique to this system and are added components to a conventional radio or television receiver.

Another embodiment may encompass all of the elements of the receiver except the control and audio in a device stored in the trunk of an automobile similar to CD music systems with an output mini radio transmitter tuned to an unused FM or AM radio channel. This radio transmitter output would be coupled to the standard automobile radio antenna for outputting of the audio signal to the user.

Another embodiment of the receiver may provide for the reception and storage of the received data on a home base unit wherein the received data is stored on a disk storage as discussed above and the disk is played back on the portable automobile unit. A further embodiment of this feature could encompass a home base unit containing all the features of an automobile unit and can be unplugged from the home base and plugged into the automobile unit for continuing use while the user is in the automobile.

The transmitting portion of the system is described in FIG. 2 indicating the following steps. The Data Generating portion 51 contains the usual human elements of News and Information Gathering step 55 with the News and Information Classified and formatted step 56, i.e. a data producing sub-system. For the audio transmission, this news and information is spoken into the electronics portions beginning with the A/D convertor 60 which converts the analog audio signals to a digital audio. The digitized audio is compressed for bandwidth considerations in data compressor 57. The compressed digitized audio is encrypted in encryptor 58 according to instructions from a Billing/ Subscriber system 55. The Encrypted digital audio establishes a data base of digitized audio data.

When it is advantageous to use alphanumeric information, the alphanumeric information is put in a form for transmission and encrypted. Switch 61 which can be controlled by an operator determines whether the system transmits compressed digitized audio or alphanumeric information. The Data is sent by a transmission path such as a dedicated telephone line 63 to a transmission station such as an existing radio and television station. In order to provide the needed quantity of audio data in a reasonable time frame the audio data must be passed through a data compression algorithm at the transmitting end to compress the audio data sufficiently for a narrow band data transmission channel. This is show as 58 in FIG. 2.

In addition to data compression, since the transmission facility is not transmitting the information in a "live" fashion as with most broadcasting facilities, it can maximize the use of the available bandwidth of transmission by not only using the above mentioned data compression techniques, but can transmit the data at a rate unrelated to the speed of speech. The speed of transmission of the data can be faster than the "real time" speech when bandwidth considerations permit. In addition, the speed of transmission can be slower than the "real time" speech if a narrower bandwidth is available. This variation in transmission speed affects the time required to transmit a given amount of information. The completed data is inserted into the FM subcarrier, Separate Audio Program channel or the television vertical interval according to the type of transmission channel chosen using a data insertion device.

In order to accommodate the fact that some subscribers may not have their units on when certain data is transmitted, it is apparent that the sending facility will need to update the data base from time to time during the day even if no new information has been generated. The data for a particular story or article will need to have a date stamp to indicate to the user the currency of the information. These and other logistical features will become apparent with the use of the system.

The above description is illustrative and not limiting; further modifications will be apparent to one of ordinary skill in the art.

I claim:

1. A receiver for receiving transmitted data comprising:
   access circuitry for extracting data from a received transmission;
   a memory coupled to the access circuitry for storing the extracted data as a database;
   a user interface for providing a set of menus describing the database, and for accepting selections from the set of menus;
   a controller coupled to the database for selecting data from the database in response to the accepted selections and providing the selected data in a digital form; and
   a speech producing sub-system for converting the selected data from the digital form to an analog signal.

2. The device of claim 1, wherein the memory stores the entire database.

3. The device of claim 1, wherein the memory comprises a combination of a volatile RAM memory and a non-volatile memory.

4. The device of claim 3, wherein the non-volatile memory is selected from the group consisting of an audio tape, a magneto-optical mini-disk, a magnetic disk or an optical disk.

5. The device of claim 1, wherein the received data is audio data that has been converted from analog form to digital form.

6. The device of claim 5, where in the received digitized audio data is digitized and has been compressed.

7. The of claim 5, wherein the digitized audio data has been encrypted.

8. The device of claim 1, wherein the received data is alphanumeric data.

9. The device of claim 8, wherein the alphanumeric data is converted to voice data by a speech synthesizer.

10. The device of claim 1, wherein the extracted data is in digital form, has been encrypted and compressed, and further comprising a decryptor for decrypting the extracted data.

11. The device of claim 10, wherein said system has a decompression algorithm to decompress data that has been compressed prior to its transmission to the receiver.

12. The device of claim 10, wherein the decryptor is enabled by a key received by the device.

13. The device of claim 10, wherein the decryptor is enabled by a key device operatively connected to the decryptor.

14. The device of claim 1, wherein the user interface is voice activated.

15. The device of claim 11, wherein the user interface includes:
   a manual input device adapted to be mountable on an automobile steering wheel, and a link from the manual input device to the controller.

16. The device of claim 11, wherein the user interface includes a control for determining a speed at which the speech output device outputs the analog signal.

17. The device of claim 1, further comprising:
   an amplifier connected to the speech producing device for amplifying the analog signal; and
   means for converting the amplified signal to sound.

18. The device of claim 1, further comprising means for connecting the receiver to an automobile radio set.

19. The device of claim 1, further comprising means for designating a hierarchy for the database.

20. The device of claim 1, further comprising means for storing said digital data received in a RAM memory up to the capacity of the RAM memory before transferring said digital data to a memory from a group consisting of a disk medium and tape medium.

21. The device of claim 20, wherein said disk medium is a digital audio tape.

22. The device of claim 21, wherein said disk medium is a magnetic disk.

23. The device of claim 20, wherein said disk medium is a magnetic-optical disk.

24. The device of claim 20, wherein said disk medium is an optical disk.

25. The device of claim 1, wherein a speed of transmission of said data can be varied.

26. A method for information dissemination for transmitting alphanumeric and audio data comprising the steps of:

converting said audio data to digital audio data;

providing said alphanumeric data as digital alphanumeric data;

establishing a data base of digitized data with menus for selection of particular segments from said data base;

compressing said digital audio data;

encrypting said compressed digital data;

encrypting said digitized alphanumeric data;

selecting between digital alphanumeric data and compressed audio data;

transmitting said selected data;

extracting the data from the transmitted signal;

providing a memory;

storing the extracted data in the memory as a database;

providing a set of menus describing the database;

selecting items from the set of menus;

providing portions of the stored data in response to the selected items from said menus;

decrypting said encrypted data;

selecting digitized alphanumeric data or compressed data;

decompressing said compressed digital data;

converting the provided portions from the digital form to a first analog signal representing audio signals;

converting alphanumeric digitized data to a second analog signal representing spoken words; and outputting said first and second analog signals for human hearing.

27. A device comprising:

an extractor for extracting data from a transmitted signal;

memory for storing the extracted data as a database;

means for providing a set of menus describing the database, and for making selections from the set of menus;

means for selecting data from the database in response to the selections;

means for providing the selected data in encrypted, compressed and digital form;

a decryptor for decrypting the selected data;

a decompressor for decompressing the decrypted data;

a converter for converting the digital data to analog audio data; and means for outputting the analog audio data.

28. A system for information dissemination to transmit audio data comprising:

a data producing sub-system for converting analog audio information to digital data and producing an associated database with menus;

a data compressor for compressing the encrypted audio data;

an encryptor for encrypting the digital audio data;

an inserter for inserting the compressed encrypted digital audio data into a transmission channel;

a receiver for receiving the transmitted compressed encrypted digital audio data;

a memory for storing the selected data in the database;

means for providing a set of menus to a user describing the database, and means for updating the data in the database;

a controller for selecting data from the database and providing the selected data in the encrypted compressed digital form;

a decryptor for decrypting the encrypted compressed digital audio data;

a decompressor for decompressing the compressed digital audio data; and a converter for converting the digital audio data to analog audio data representing the analog audio information.

* * * * *